(12) United States Patent
Whitlock et al.

(10) Patent No.: US 7,467,709 B2
(45) Date of Patent: Dec. 23, 2008

(54) CONTINUOUS BELT FOR A BELT-TYPE SEPARATOR DEVICE

(75) Inventors: David Whitlock, Watertown, MA (US); Bulent Sert, Marblehead, MA (US)

(73) Assignee: Separation Technologies LLC, Needham, MA (US)

( * ) Notice: Subject to any disclaimer, the term of this patent is extended or adjusted under 35 U.S.C. 154(b) by 361 days.

(21) Appl. No.: 11/179,169

(22) Filed: Jul. 12, 2005

(65) Prior Publication Data

US 2005/0279451 A1 Dec. 22, 2005

Related U.S. Application Data

(62) Division of application No. 10/259,257, filed on Sep. 27, 2002, now Pat. No. 6,942,752.

(60) Provisional application No. 60/325,426, filed on Sep. 27, 2001.

(51) Int. Cl.
*B65G 17/00* (2006.01)

(52) U.S. Cl. .................... 198/844.2; 156/157; 156/158; 156/159; 156/304.5; 156/304.6; 156/137; 428/57; 428/58; 428/60; 428/192; 428/213

(58) Field of Classification Search .............. 198/844.2; 156/157–159, 304.5, 304.6, 137; 428/57, 428/58, 60, 192, 213
See application file for complete search history.

(56) References Cited

U.S. PATENT DOCUMENTS

| | | | |
|---|---|---|---|
| 1,931,322 A | | 10/1933 | Kepler |
| 4,034,617 A | * | 7/1977 | Guyer ........................ 198/847 |
| 4,105,111 A | * | 8/1978 | Lapeyre .................... 198/844.2 |
| 4,211,594 A | | 7/1980 | Freitag et al. |
| 4,430,146 A | | 2/1984 | Johnson |
| 4,839,032 A | * | 6/1989 | Whitlock ........................ 209/3 |
| 4,874,507 A | * | 10/1989 | Whitlock ...................... 209/11 |
| 5,170,281 A | * | 12/1992 | Kobayashi et al. .......... 359/245 |
| 5,240,531 A | * | 8/1993 | Toda et al. ................... 156/137 |
| 5,246,100 A | * | 9/1993 | Stone et al. .............. 198/844.2 |
| 5,275,858 A | * | 1/1994 | Hock .......................... 428/58 |
| 5,326,411 A | * | 7/1994 | Arnold ....................... 156/137 |
| 5,342,250 A | | 8/1994 | Sanders |
| 5,356,682 A | | 10/1994 | Stewart et al. |
| 5,377,818 A | * | 1/1995 | White ..................... 198/844.2 |
| 5,447,588 A | | 9/1995 | Merz et al. |
| 5,531,316 A | * | 7/1996 | Savino .................... 198/844.2 |
| 5,562,796 A | | 10/1996 | Ertel |

(Continued)

FOREIGN PATENT DOCUMENTS

DE 3527599 2/1987

(Continued)

*Primary Examiner*—Gene O. Crawford
*Assistant Examiner*—Leslie A Nicholson, III
(74) *Attorney, Agent, or Firm*—Lowrie, Lando & Anastasi, LLP.

(57) ABSTRACT

The application discloses a belt formed of first and second portions of thermoplastic sheet including, respectively, first and second pluralities of tabs spaced apart so as to define first and second pluralities of openings along corresponding first and second edges of the first and second portions of thermoplastic sheet, wherein the first plurality of tabs are joined to the second plurality of tabs so as to join the first edge to the second edge.

25 Claims, 6 Drawing Sheets

U.S. PATENT DOCUMENTS

| | | | |
|---|---|---|---|
| 5,670,230 A * | 9/1997 | Schlueter, Jr. et al. | 428/57 |
| 5,698,358 A | 12/1997 | Yu | |
| 5,819,946 A | 10/1998 | Whitlock et al. | |
| 5,904,253 A * | 5/1999 | Cerullo et al. | 209/128 |
| 6,131,728 A * | 10/2000 | Rizhanovsky | 198/844.2 |
| 6,234,305 B1 * | 5/2001 | Brown et al. | 198/844.2 |

FOREIGN PATENT DOCUMENTS

| | | |
|---|---|---|
| EP | 0080729 | 6/1983 |
| GB | 1039898 | 8/1966 |
| GB | 2001357 | 1/1979 |
| JP | 48-089268 | 11/1973 |
| JP | 48 089269 | 11/1973 |
| JP | 11300835 | 11/1999 |
| JP | 6004323 | 3/2007 |

* cited by examiner

CONTINUOUS BELT FOR A BELT-TYPE SEPARATOR DEVICE

CROSS-REFERENCE TO RELATED APPLICATIONS

This application claims priority under 35 U.S.C. § 119(e) to U.S. application Ser. No. 10/259,257 filed on Sep. 27, 2002 which claims priority to U.S. Provisional Application Ser. No. 60/325,426 filed on Sep. 27, 2001, which is herein incorporated by reference in its entirety.

BACKGROUND

1. Field of the Invention

The present invention relates to a movable belt that may be used in a belt separation apparatus to separate a particle mixture based on charging of the particles, and more specifically to an improved belt and a method of belt construction.

2. Discussion of Related Art

Belt separator systems (BSS) are used to separate the constituents of particle mixtures based on the charging of the different constituents by surface contact (i.e. the triboelectric effect). FIG. 1 shows a belt separator system 10 such as is disclosed in commonly-owned U.S. Pat. Nos. 4,839,032 and 4,874,507, which are hereby incorporated by reference in their entirety. One embodiment of belt separator system 10 includes parallel spaced electrodes 12 and 14/16 arranged in a longitudinal direction to define a longitudinal centerline 18, and a belt 20 traveling in the longitudinal direction between the spaced electrodes, parallel to the longitudinal centerline. The belt 20 forms a continuous loop which is driven by a pair of end rollers 22, 24. A particle mixture is loaded onto the belt 20 at a feed area 26 between electrodes 14 and 16. Belt 20 includes counter-current traveling belt segments 28 and 30 moving in opposite directions for transporting the constituents of the particle mixture along the lengths of the electrodes 12 and 14/16.

As the only moving part, the belt 20 is a critical component of the BSS. The belt 20 moves at high speed, for example, about 40 miles an hour, in an extremely abrasive environment. The two belt segments 28, 30 move in opposite directions, parallel to centerline 18, and thus if they come into contact, the relative velocity is about 80 miles an hour. Related art belts were previously woven of abrasion resistant monofilament materials. These belts were quite expensive and lasted only about 5 hours. The mode of failure was typically longitudinal wear stripes due to longitudinal wrinkling, that would wear longitudinal holes in the belt such that it would fall apart and catch on itself. The strands would also wear where they crossed and flexed in moving through the separator. The Applicant has made attempts to improve such belts with different materials and different weaves in an attempt to find a woven material with a longer life. These attempts were unsuccessful.

Belts which are currently used in the BSS 10 are made of extruded materials which have better wear resistance than the woven belts and may last on the order of about 20 hours. The extrusion of such belts is described in commonly-owned U.S. Pat. No. 5,819,946 entitled "Separation System Belt Construction," which is herein incorporated by reference.

Referring to FIG. 2, there is illustrated schematic drawing of a section of a belt 40 such as is currently used in the BSS of FIG. 1. Control of the geometry of the belt is desirable, but is difficult to achieve with extruded belts.

One example of the belt used in the BSS may comprise a structure formed of machine direction strands 42, i.e., strands that are disposed along a horizontal length of the belt in a direction of movement of the belt (indicated by arrow 41), and cross direction strands 46, i.e., strands that are substantially perpendicular to the machine direction strands, as illustrated in FIG. 2. The cross direction strands 46 may be made with a specific shape of a leading edge 43 of the belt. The machine direction strands 46 carry the load, i.e., a mixture of constituents, and simultaneously withstand the flexing of passing over the end rollers (see FIG. 1, 22, 24) at a rate of approximately 6 rollers per second.

The extrusion process by which belts for the BSS are currently made is necessarily a compromise of a number of factors including the choice of the polymer used, the choice of additives, the extrusion equipment, the temperatures used for the extrusion process and the extrusion rate. According to one example, the operation of the extrusion process for the current manufacture of extruded belts is as follows. A proper mix of a base polymer and additives (preferably pre-compounded together) is fed into an extrusion machine, where the mechanical action of a screw heats the material to a temperature where it is plastic, and the extrusion machine moves the plastic down a barrel and into a die. The die has a circular cross section, and has a number of grooves parallel to an axis which corresponds to the continuous machine direction strands 42. Each cross direction strand 46 is produced by moving an inner part of the die so that a circumferential groove which is filled with material empties and so forms the cross direction strand 46. Control of the geometry of the belt is mostly accomplished by adjusting the instantaneous extrusion rate during the formation of each individual cross direction strand 46. Material that ends up in the cross direction strand is not available for the machine direction strand and vice versa. It may be difficult therefore, to avoid changes in the machine direction strand cross section while changing the extrusion rate to adjust the cross strand geometry. After the web of machine direction strands and cross direction strands is formed as a circular section, it is cooled, for example, through immersion in a water bath and slit and flattened to form a flat web.

Fatigue strength is an important aspect of the belt to be used in a BSS. For good fatigue strength, stress concentrations at changes in cross section of the strand should be avoided. Maintaining uniformity of cross section is difficult however, and thus fatigue life of extruded belts is often problematic.

Conveyer belts are widely used for conveying materials, and conventional conveying belts are well developed. Usually conveyor belts are constructed of an elastomeric material with reinforcing cords of fabric. A usual practice is to use continuous solid belts without perforations. Such belts are not suitable for the present application because of the need for material to pass through the belt in the BSS.

Control of the belt geometry is also important as is described in commonly-owned U.S. Pat. No. 5,904,253, also herein incorporated by reference. Referring to FIG. 3, which is an enlarged portion of the BSS of FIG. 1, the directions of the counter-travelling belt segments 28, 30 are shown by arrows 34 and 36, respectively. As illustrated in FIG. 3, one example of a desired geometry of the belt 40, is that of an acute angle 44 on the leading edge 43 (see FIG. 2) of the cross direction strands 46.

In the current practice of extrusion, the geometry of the leading edge is controlled by adjusting the polymer composition, the additives used, and the extrusion conditions. Changing these parameters also has effects on the other properties of the belt and on its performance in the BSS. In addition, in an extrusion process, the polymers that can be used to make such belts are limited. There are a number of polymers that cannot be extruded and so are not options for belt manufacture by extrusion. In addition, large amounts of extrusion additives are needed to achieve desired belt properties through an extrusion process. However, the presence of many additives complicates the extrusion process and can pose compatibility problems, especially for food grade applications. Many of the additives needed for dimension control also act as plasticizers and increase the rate of creep and decrease wear resistance of the belt. Often changing one property in one way will have an adverse effect on other properties.

Thus known methods of manufacture of belts for BSS are subject to the limitations of the extrusion process, which limits the materials which can be used for belt construction, and compromises the geometry that can be obtained. Current belts do not have the desired long wear life, good fatigue strength, and ease of manufacture that is desired.

SUMMARY OF THE INVENTION

One embodiment of a belt comprises a first portion of thermoplastic sheet comprising a first edge inclined with respect to a surface of the belt and having a first plurality of openings along the first edge of the first portion of thermoplastic sheet so as to form a first plurality of recesses. The belt also comprises a second portion of thermoplastic sheet comprising a second edge inclined with respect to the surface of the belt and a second plurality of openings along the second edge of the second portion of thermoplastic sheet so as to form a second plurality of recesses. The first and second inclined edges are joined together with a slight overlap to form overlapping portions. The first and second plurality of openings extend beyond the overlapping portions.

According to another embodiment, a belt comprises a first portion of thermoplastic sheet comprising a first plurality of tabs spaced apart so as to define a first plurality of openings along a first edge of the first portion of thermoplastic sheet. The belt also comprises a second portion of thermoplastic sheet comprising a second plurality of tabs spaced apart so as to define a second plurality of openings along a second edge of the second portion of thermoplastic sheet. The first plurality of tabs are joined to the second plurality of tabs so as to join the first edge to the second edge. The first and second plurality of openings extend beyond the joined first and second edges.

BRIEF DESCRIPTION OF THE DRAWINGS

The foregoing and other features, objectives and advantages of the present invention will be apparent from the following description with reference to the accompanying figures in which like reference numerals indicate like elements throughout the different figures. In the figures, which are provided for purposes of illustration only and are not intended as a definition of the limits of the invention.

DETAILED DESCRIPTION

Figure 1:
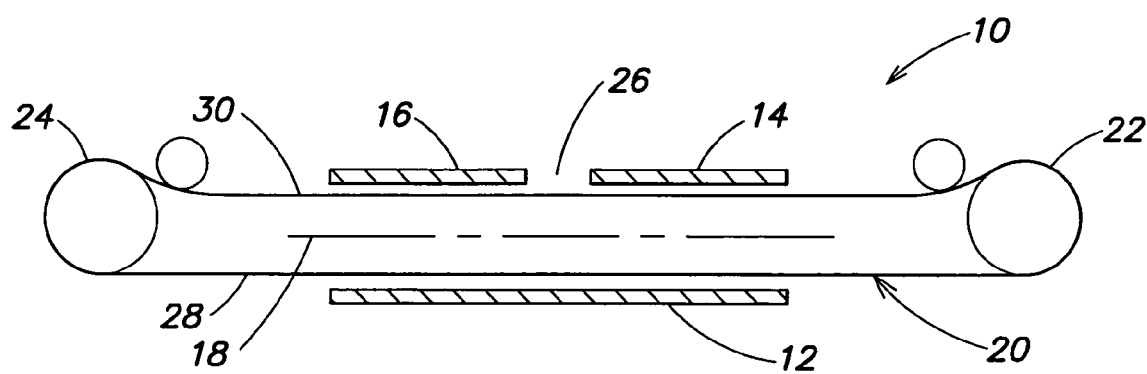
FIG. 1 is a diagram of one example of a belt separator system (BSS)
Figure 2:
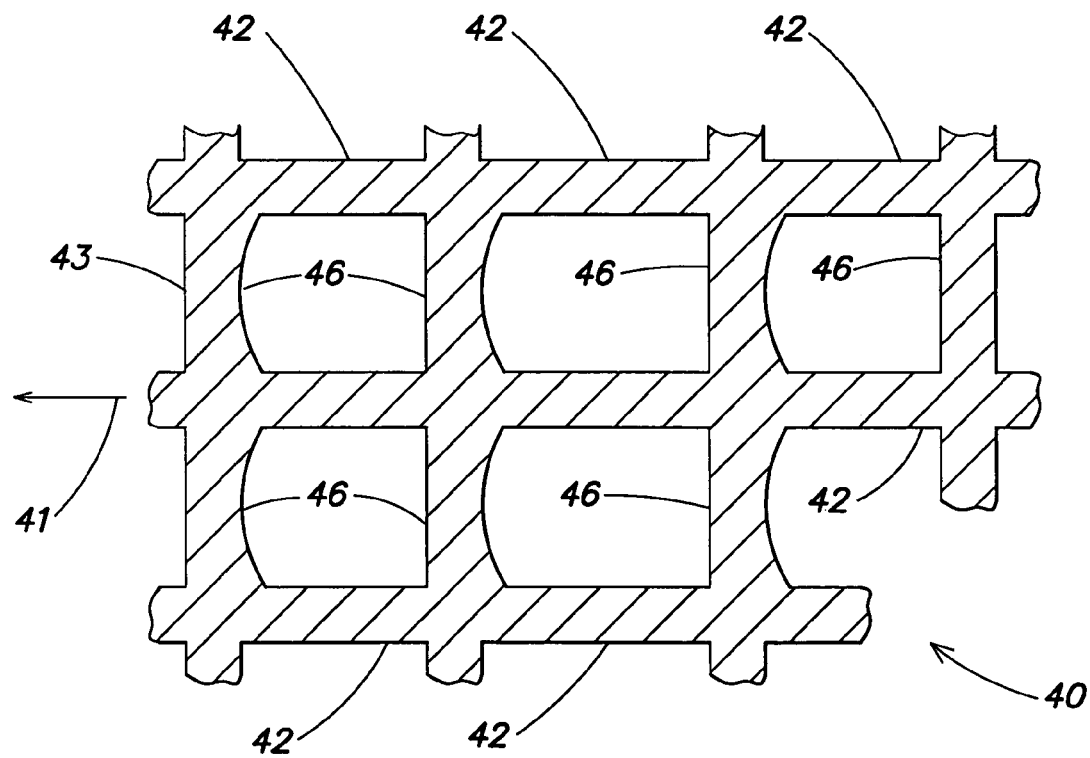
FIG. 2 is an enlarged diagram of a portion of an extruded belt used in a BSS.

Certain materials, such as thermoplastic materials that contain polymerization products of at least one olefinic monomer, thermoplastics and thermoplastic elastomers are materials that have properties suited to BSS belts. One example of a potentially useful thermoplastic material is nylon, another is ultra high molecular weight polyethylene (UHMWPE). UHMWPE is one example of an excellent material which has properties that make it ideal for BSS belts. It is extremely abrasion resistant, e.g., about an order of magnitude more resistant than the next best material in similar service, it has a low coefficient of friction, is non-toxic, is an excellent dielectric, and is readily available. Unfortunately it cannot be extruded and so belts cannot be manufactured of it using known extrusion techniques.

UHMWPE melts at 138 degrees Celsius. The melting point is determined optically when the opaque white material becomes completely clear. The viscosity of melted UHMWPE is so high that it does not flow when melted, and articles retain their shape even when completely melted. The extreme viscosity of UHMWPE when molten results in considerable delay in the formation of crystalline domains on cooling of the molten UHMWPE, and thus the crystallization of UHMWPE is not instantaneous. Like all polymer materials, UHMWPE has a high coefficient of thermal expansion. It also expands considerably on melting. This expansion and contraction during and after thermal cycling presents substantial difficulties in the thermal processing of UHMWPE. Conventional mold materials of construction, such as metals, have much lower thermal expansion than UHMWPE. Consequently, shrinkage during cooling of UHMWPE sets up significant thermal strains between the mold materials, UHMWPE sections at different temperatures, and even between UHMWPE sections with different degrees of crystallinity. The degree of crystallinity is a factor in determining the density and hence the volume of any particular portion of a UHMWPE part.

According to one example of a method of manufacturing UHMWPE articles, UHMWPE is synthesized as a powder. The powder may be compression molded, at high temperature and pressure, into thick billets which may be skived, while hot, into sheets of the desired thickness. UHMWPE is molded as thick billets because the gradients in temperature, crystallinity, density and hence specific volume are small, relative to the dimensions of the billet, leading to small thermal strains. In a thick billet, the ratio of the stress on the molded surface to the contraction stress of the bulk of the material is relatively low. By contrast, thin sections have a higher ratio and are more likely to either fail through cracking or to yield asymmetrically, resulting in built-in stresses.

According to one example, BSS belts are thin, for example, on the order of ⅛ of an inch and are about 45 inches wide. A length of material used to form a BSS belt may be approximately 60 feet. Sheets of UHMWPE are commercially available in sheet sizes of 4 feet by 8 feet or 4 feet by 10 feet. Thus, a BSS belt may be formed by joining together several such sheets, as is discussed below in more detail. Alternatively, a BSS belt may be formed of a single sheet of UHMWPE, the ends of which may be joined together to form continuous belt. In yet another example, several narrow sheets may be joined along a length of the sheets to form a wide composite sheet, the ends of which may then be joined together to form a continuous belt.

Welding, or joining, together of pieces of UHMWPE is not practiced to any significant extent in the related art, largely because of the difficulty of dealing with the thermal strains that result. Thus while UHMWPE is widely used for abrasion protection of steel surfaces, it is used as individual sheets which are mechanically fastened to the protected steel surface. When conventional heat sealing type equipment is used to attempt the welding of UHMWPE using techniques that are suitable for other polymers, the results are not satisfactory. The weld zone becomes liquid, indicated by it becoming clear, and two liquid pieces will adhere if pressed together. However, when the article is cooled the heat-affected zone contracts substantially which results in substantial warping of the sheet. The warping increases as the article continues to crystallize, and often sheets will crack as they cool. For example, the heated material accommodates the thermal strain by deforming plastically when it is hot. Then, as the cooling material contracts, it becomes too stiff to deform plastically and so it either warps or cracks. Sheets can be seen to be flat immediately after removal from a welding device and cooled to room temperature, only to warp a day later due to continued crystallization and shrinkage.

The stiffness of UHMWPE is also a sensitive function of the degree of crystallization. Less crystalline material is softer and has a lower modulus. However, as the belt for a BSS is operated, the material is flexed many times a second. This flexing has a tendency to cause the material of the belt to further crystallize, resulting in further dimensional and stiffness changes.

Belts for a BSS move at high speed, for example, on the order of 20 meters per second, through a narrow gap. At this speed, the belt can be quickly destroyed if it catches on something or hits a piece of tramp material. Warping of the belt which causes it to deviate from the plane of the electrodes is unacceptable because the belt then pushes against the electrode and the other segment of belt traversing between the electrodes of the BSS, which increases the load and also can lead to the belt "catching" on itself or on the openings in the electrode where the feed is introduced. The belt "catching" can result in a catastrophic failure of the belt. The belt may also become completely severed longitudinally into two independent pieces. When the two remaining segments of belt continue to operate in the BSS, an undesirable situation is created because there is a stagnant stationary region between the two moving pieces where conductive material can build up and cause a shorting of the high voltage electrodes.

Figure 3:
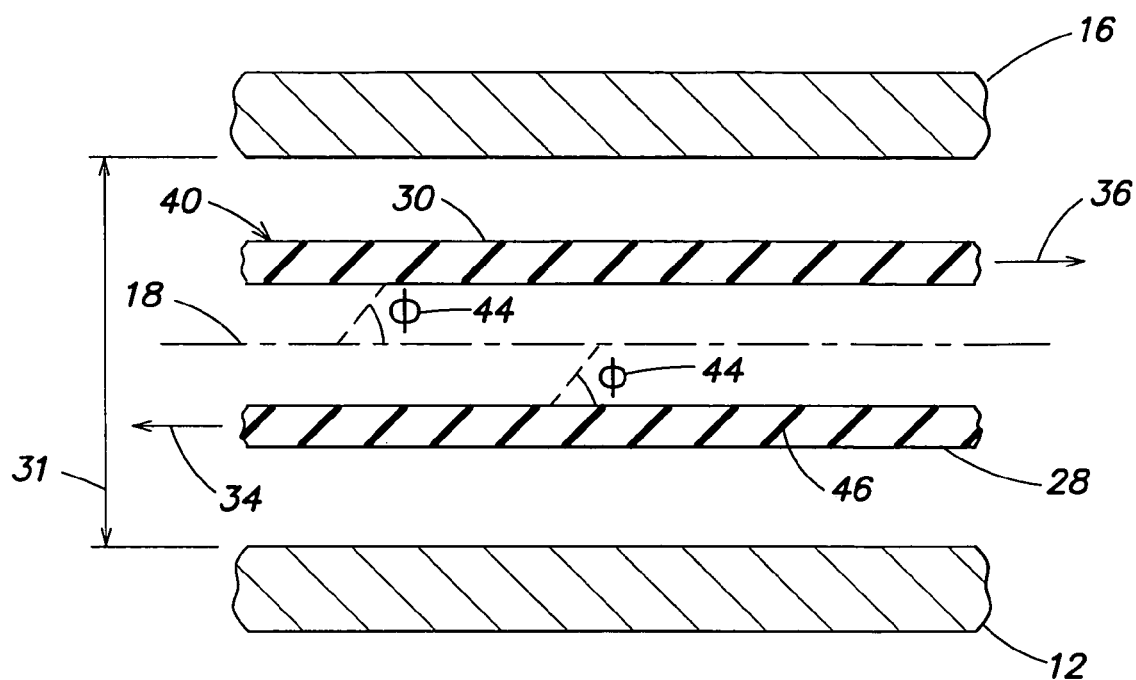
FIG. 3 is an enlarged view of a portion of a BSS including two electrodes and belt segments.

In order to avoid the belt catching on the openings, warping of the belt must be kept to less than half the width of the gap 31 (see FIG. 3) between the electrodes 12, 16. Applying tension to the belt might be thought to straighten out any warp. However, virtually every material will warp if sufficient tension is applied. All materials have a certain Poisson's ratio which requires that when a material is stretched in one direction it contracts in all transverse directions. For example, a thin belt material cannot support this compressive load across its width and so it buckles, resulting in longitudinal wrinkles. One failure mode that has been observed in certain woven belts is longitudinal wrinkling leading to the parts of the belt that protrude being worn away. Wearing away of warped sections of the belt is not acceptable in most BSS applications.

In theory, heating and cooling entire belt sections at a time might make welding the belt sections together possible. In practice however even that approach is problematic. What causes the warping is gradients of thermal expansion leading to differential thermal strains leading to differential stresses in the material. Thermal expansion of the material is due to both the temperature change and to the phase change. The phase change is not entirely uniform and isotropic. Thus a uniform temperature applied to the entire belt sections would not necessarily produce equal expansion and contraction of the material. Above the melting point the material is viscoelastic, where the stress depends on the strain rate. In addition, heating and cooling entire belt sections at one time would require a very large mold and because the belt is desirably quite thin, the belt would likely crack when cooled in contact with a rigid metal mold.

The warping that occurs when welding two sheets of material together derives from irreversible deformation that occurs during the heating and cooling cycle. UHMWPE must be heated to well above the melting point to achieve sufficient mobility for the surface molecules to interdiffuse and form a strong bond upon cooling. The UHMWPE expands during heating, the total volume change being on the order of 10%, and the yield stress of the hot material is much lower than the unheated material. Cool material near the heat affected zone restrains the hot material which yields. As the hot material cools, it shrinks, and as it becomes cooler and stiffer the yield stress increases and it is able to exert sufficient stress on the unheated material to cause deflection or deformation. Making the welded zone thinner causes the accumulated stress in the heated material during cooling to exceed the strength of the cooling material and it fails by cracking. Making the weld very thin also reduces the strength of the weld.

Deformation or warp of the belt made from UHMWPE is determined by the contraction of the heat affected zone and the buckling of the surrounding material. The amount of any warpage is dependent on the total strain, which depends on the total length of the weld. For example, in a 40 inch wide belt, a 10% strain (resulting from a 10% change in volume as discussed above) results in plus 2 inches of deformation for cold material and minus 2 inches of deformation for hot material. There is some yielding of the hot material, but even a 2.5% length change (1 inch in 40) results in substantial warpage. The warpage out of the plane of the belt may be a critical parameter for BSS belts, and depends on the wavelength of the warp. If the warp is taken up as a single sine wave, the total out of plane deformation can be calculated approximately by:

$$d^2 = \left(\frac{\lambda}{4} * 1.025\right)^2 - \left(\frac{\lambda}{4}\right)^2 \quad (1)$$

where d=deformation and λ=wavelength.

Thus, if the wavelength of the sine wave is 80 inches (twice the length of the 40 inch weld), equation 1 yields a total deformation, d, of 4.5 inches. This is far too much to be accommodated in most systems, because if, in order to avoid the belt catching on openings as discussed above, warping of the belt must be kept to less than half the width of the gap between the electrodes, a deformation of 4.5 inches means that the gap width between the electrodes should be at least 9 inches. This is too wide a separation of the electrodes for efficient operation of the BSS. By contrast, if the same percentage strain is taken up with a warpage wavelength of 2 inches, the out of plane deformation, d, given by equation 1 is now 0.1 inches. This amount is less than the usual gap between the electrodes of the BSS. In practice much of this deformation is taken up plastically and elastically so the actual warpage may be much less than 0.1 inches.

As mentioned above, the wavelength of the deformation determines the magnitude of the out of plane protrusion of the belt/sheet. The part of the sheet that experiences compressive thermal strain buckles because the compression load is greater than the critical load that can be resisted without buckling. The critical load that produces buckling is lowest at the longest wavelength deformation and increases rapidly as the wavelength decreases. This critical load can be calculated using Euler's column formula:

$$P_{cr} = \pi^2 * E * \frac{A}{L^2} \tag{2}$$

where E is the modulus of the material, A is the moment of inertia of the column and L is the length of the weld.

Strain accumulates between the heat affected and non-heat affected zones of welded sections of the belt formed of UHMWPE, and causes deformation. The wavelength of the warp deformation may be controlled by setting the boundary conditions for stress and strain to zero at the ends of the weld by creating free edges. Short welds result in a higher critical load for buckling and at this higher load, more of the thermal strain is accommodated through non-buckling deformation. If the welds are made short, all of the warp will be accommodated within the welds, and the wavelength will then be at most twice the length of the weld (one half a sine wave). Thus, by making the welds short (on the order of 1 inch) the out of plane component of any warpage will be small.

Therefore, one aspect of a sheet welding method of the invention is to provide openings, for example, cuts in the sections of, for example, UHMWPE, to be welded such that the length of weld is relatively short, and so that the heat affected zone is within the area bounded by the openings. This allows the thermal strains to be taken up elastically in the heat affected and non-heat affected material. For example, sheets that have been joined by the process of this invention may be on the order of 10 feet long, or 120 inches. The heat affected zone is on the order of 1.2 inches wide, or approximately 1% of the sheet length. Welding of the UHMWPE sheets under these conditions does produce holes in the belt, however in BSS's most of the belt is open area and additional openings around a joint are not detrimental. Any warpage in the resultant welded sheets is very small and does not protrude beyond the plane of the belt. It is to be appreciated that individual small sheets can be so joined to form composite sheets, and a single sheet or a composite sheet can be joined to itself to form an endless loop.

Figure 4:
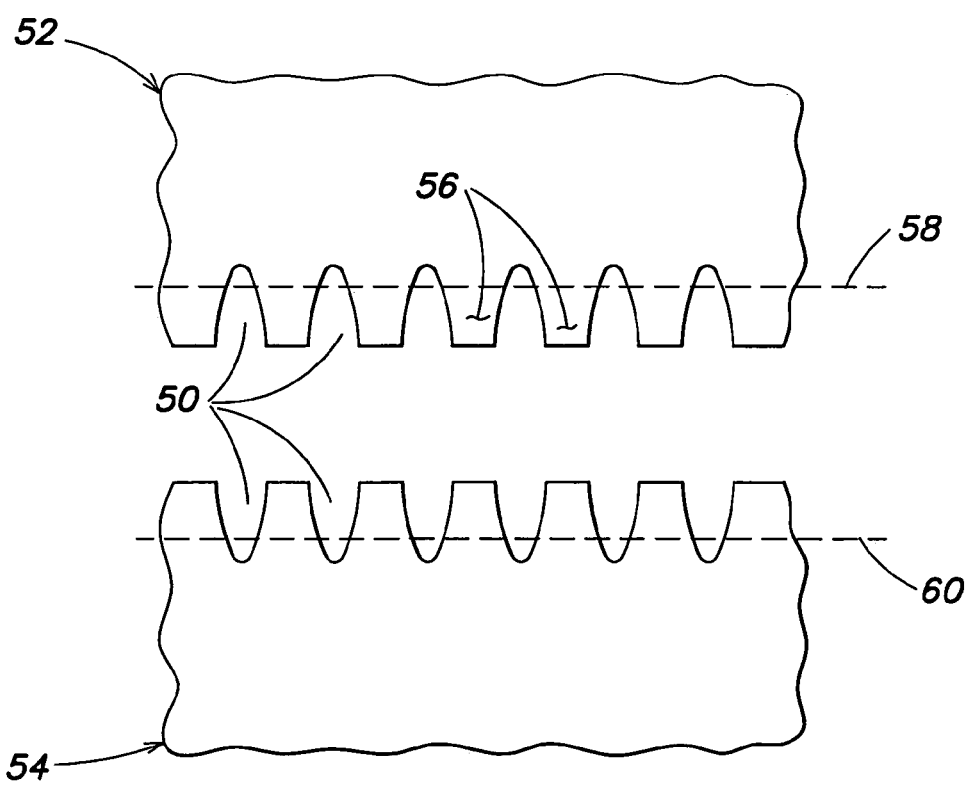
FIG. 4 is a diagram of a portion of two sections of belt to be joined together, according to an embodiment of the invention.

Referring to FIG. 4, there is illustrated a portion of one example of the edges of a sheet prepared for welding according to the present invention. It is to be appreciated that joining may be accomplished by thermal welding, and also by other methods of plastic welding known to those of skill in the art, such as ultrasonic, dielectric, infrared. As discussed above, openings 50 are formed in each of a first sections (or sheet) 52 and a second section (or sheet) 54 of UHMWPE that are to be joined to form a belt. It is to be understood that the sections 52 and 54 of UHMWPE may be different sheets that are to be joined together, or may be edges of a same sheet or a composite sheet that are to be joined to form a continuous belt. Openings 50 are made in the sheet prior to the formation of the join. The openings 50 in the material at the join serve two purposes. First, space is provided where the material is removed by the cuts to accommodate the free expansion of the UHMWPE as it expands during the heating. Second, adjacent join sections 56 (tabs of material) are decoupled from each other so that the thermal strain in one section that results during cooling and contraction does not add to an adjacent section, and so accumulate along a long length of the join. Accommodating the expansion on heating and allowing contraction on cooling prevents thermal strains from accumulating across the width of the belt and causing warpage of the belt during the welding process.

Lines 58 and 60 demarcate the extent of the heat affected zone during a joining process. It can be seen that the openings 50 extend past the heat affected zone so that the heat affected zone is within the area bounded by the openings. This allows the thermal strains to be taken up elastically in the heat affected and non-heat affected material, as discussed above. In the illustrated example, the openings have rounded surfaces. It is desirable to prevent stress concentration at the base of the opening, and so it may be desirable to use a rounded cutter to form the opening, however, other shaped openings may be used as well. According to one example, the width of the belt (sections of material to be joined) may be approximately 40 inches, and the tabs of material 56 that form the material of the weld are approximately 1 inch wide. The width of the openings 50 is not critical, so long as material from adjacent tabs 56 does not expand across the opening 50 during the welding process and upset the stress and strain free edge boundary condition.

Breaking the weld up into a number of shorter weld segments with open space (i.e., the openings 50) between them, as illustrated, also has the advantage that the open spaces act as crack terminators. Cracks readily propagate through a solid material because the stress is concentrated at the tip of the crack. An opening sufficiently large that the stress of the crack can be distributed elastically around the opening is an effective crack terminator.

A critical parameter of BSS belts may be their uniformity of thickness and the lack of protrusions from the surface which can catch on openings in the electrodes or on the confronting section of the belt as the belt traverses with the BSS. As discussed above, making the joint between sheets of a multiplicity of short welds addresses the warpage problem, but the joining procedure should also not generate protrusions. A butt weld, e.g., a weld of planar surfaces, does not have sufficient strength to withstand normal tensile loads in an operating BSS and there is a discontinuity in material stiffness across such a joint. During passage over the multiple rollers of the separator (at a rate of approximately 6 per second), the joint is subjected to multiple cycles of positive and negative bending. This cyclical back and forth bending results in failure of the joint in a butt weld. In contrast, a joint made by simply overlapping material may result in excess thickness of the joint and the belt. Constraining the thickness by confining the weld between heated platens may cause the excess material to extrude out. UHMWPE does not deform plastically in these cases, instead, the material cracks. The cracks provide for stress concentrations which have the potential to propagate into the bulk material. Discontinuities in temperature history can also cause discontinuities in degree of crystallinity and hence discontinuities in material modulus. Such discontinuities in modulus can also lead to stress concentration and cracking.

Figure 5:
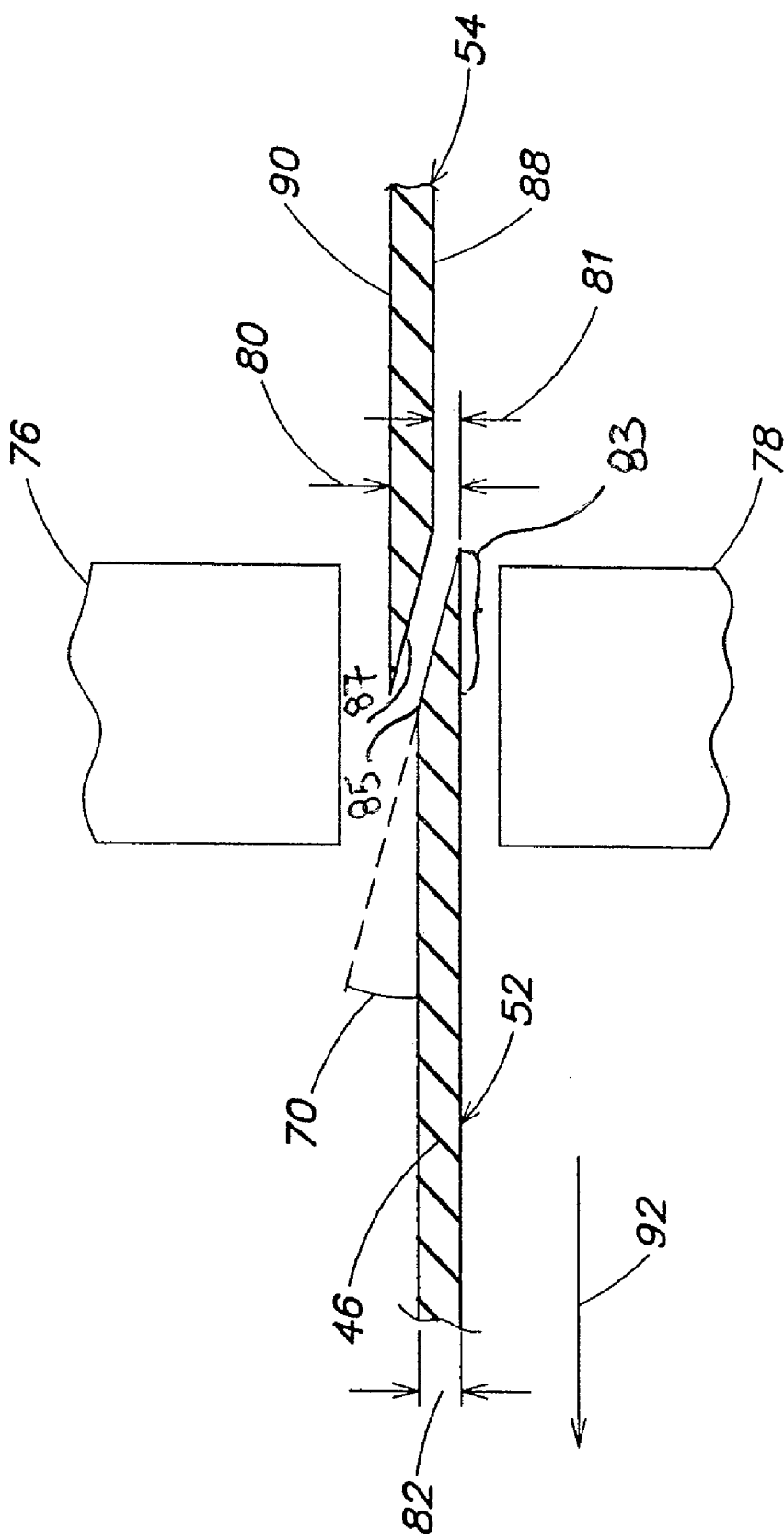
FIG. 5 is a side view of the two sections of belt to be joined together, according to an embodiment of the invention.

Accordingly, to avoid the above-described problems, a weld joint preparation exhibiting tapering of the sections to be joined, may used according to one embodiment of the invention. FIG. 5 illustrates a cross-section of a weld according to an embodiment of the invention. As shown in FIG. 5, each of the tabs of material 56 (see FIG. 4) may be tapered with an angle 70. In one embodiment, substantially matching angles may be formed on each of the two sheets (or edges) to be joined, such that when the sheets are placed together with a slight overlap 83, of overlapping portions 85 and 87, the substantially matching angled edges fit together, as shown. The tapering of the join is of particular importance. This tapering allows any discontinuity in modulus which occurs in the welded material to be spread out over a longer space and so reduces any tendency for stress concentration.

A large percentage of open area is desirable in a BSS belt, and a "strong" belt is also desirable. Thus, there is a need to optimize a tradeoff between these two features. The strength of the welded joint depends on the cross section of that joint. The strength of the heat affected material at the weld is lower than that of the bulk material. However, much of the bulk material is removed to provide for the open area that is necessary for proper BSS operation. The weld therefore, need only be as strong as the weakened material of the remainder of the belt. This may be accomplished by using a larger cross section for the welds than for the remainder of the belt. Increasing the area of the weld allows the joint to develop the full strength of the material even though the weld itself has lower strength. Using a tapered joint, such as illustrated in FIG. 5, also reduces the discontinuity in material properties that can lead to stress concentration and eventual failure.

Referring again to FIG. 5, the weld may be produced by machining the two ends 52, 54 to be joined in matching acute angles, as discussed above. In one example, the angle may be less than approximately 30 degrees. The smaller the angle the larger the cross section of the weld. The tensile load on the belt is transferred by shear through this weld. In one example, an angle (70) of 15 degrees has been used and has worked well. This angle increases the cross section of the joined area for the transfer of the tensile load by shear by about 4 times the cross section of the unmachined material. In another example, a range of 10 to 45 degrees may be used. If the angle is too large, there is limited overlap, and the accuracy required for the edge preparation may become excessive. Similarly, when the angle gets too small, the sections become very thin and the weld width may become excessive.

The strength of the joint exceeds that of the bulk material even if the strength of the weld is ⅓ that of the base material. However the joint does represent a weakened portion of the belt and care needs to be taken that failure does not start at one point and propagate through fatigue to other regions. This is accomplished by ensuring that the open segments are sufficiently open that the excess material can freely expand during the welding process and by ensuring that there are no surface defects in the heat affected material such as surface cracks which may initiate propagating fatigue cracks. If any such cracks do form during the welding process, it is desirable to machine away the cracked material before using the belt.

Figure 6:
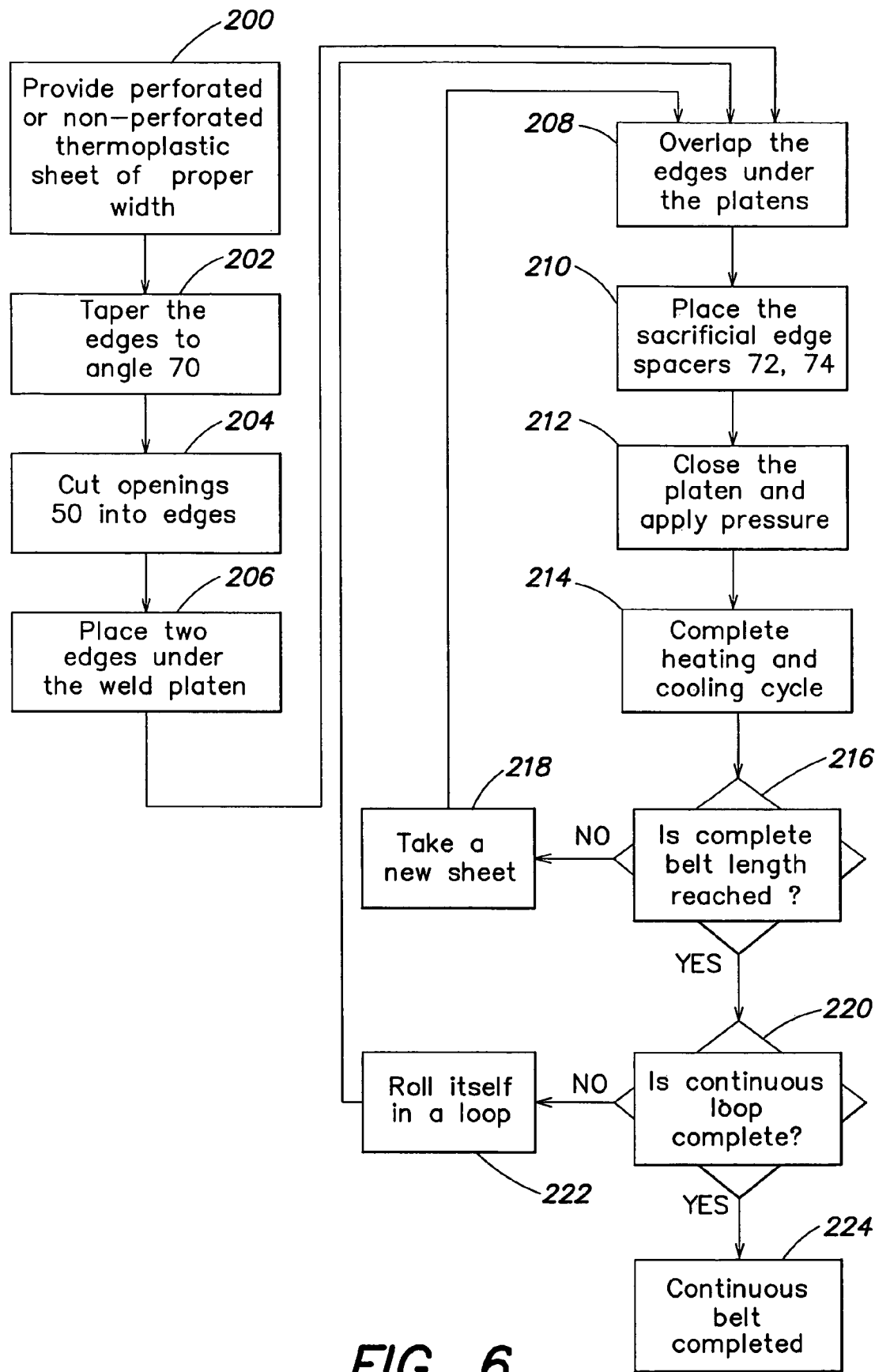
FIG. 6 is a flow diagram of one example of a method for manufacturing a belt according to aspects of the invention.

Referring to FIG. 6, there is illustrated a flow diagram of one embodiment of a method for manufacturing a belt, according to aspects of the invention. As discussed above, in a first step 100, one or more sheets of thermoplastic sheet may be provided that are to be joined together. In one example, two or more sheets may be joined to provide a larger composite sheet, that may ultimately formed into a continuous belt. Opposing edges of either a single sheet or a composite sheet may be joined to form a continuous belt. The following method applies to either the joining of separate sheets or of opposing edges of a same sheet.

Figure 7:
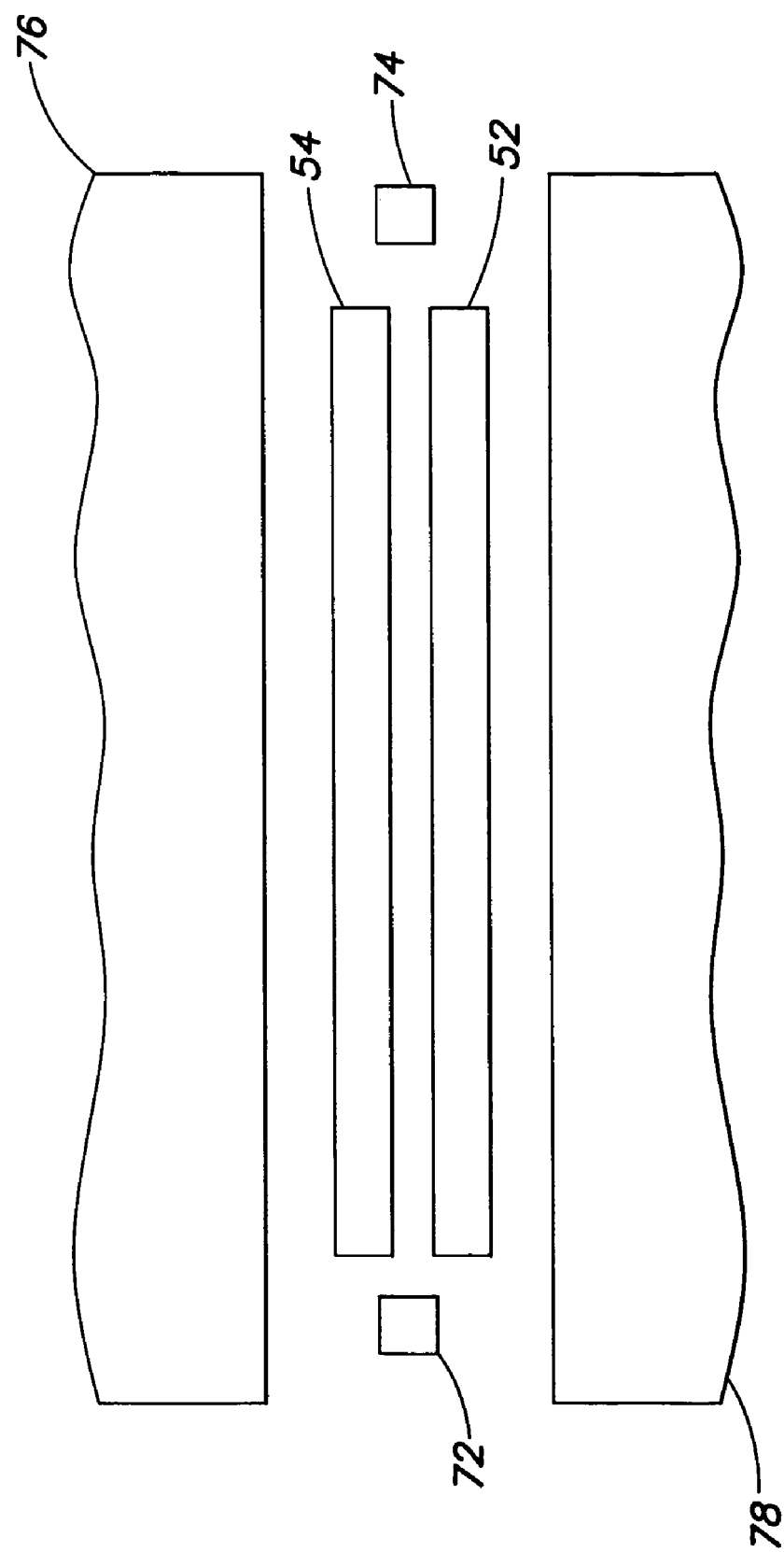
FIG. 7 is an end view of two sections of belt to be joined together, according to aspects of the invention.

In a next step 202, the edges to be joined may be tapered, and the openings 50 (see FIG. 4) formed (step 204), as discussed above. The weld of the edges may be begun to be produced, in steps 206 and 208, by orientating the two ends of the sheets 52, 54 in a welding machine which presses the machined ends of the sheets together with flat platens 76, 78 such that there is an overlap 83 of overlapping portions 85 and 87, as shown in FIG. 5. The space between the platens may be controlled by the introduction of spacer elements 72 and 74, in step 210. When sufficiently rigid platens are used, the spacers can be disposed at the ends, as shown. If less rigid platens are used, the spacers may be inserted along an interior, for example in the open space provided by openings 50 between the tabs of material 56 (see FIG. 4). The location of these spacers is illustrated in FIG. 7 which shows an end view of the sheets 52, 54 between the platens 76, 78. The spacer elements 72, 74 may have a thickness that is substantially equal to a thickness of the belt, and are made of a material that does not soften at the temperatures used.

The platens 76, 78 are then closed, as indicated in step 212, and pressure is applied to the platens, and transferred through the platens to the sheets 52, 54. In a next step 214, the platens are heated either electrically or more conveniently with a circulating hot fluid. Pressure is maintained on the weld during the heating and cooling cycle. In one example, the temperature is increased to approximately 395 F. (or 202 degrees C.) and is held for about 30 minutes. The heating is then stopped, and cooling fluid is circulated to cool the weld to near ambient temperature. The weld is cooled so that it does not deform on being removed from the weld machine. The belt should be kept in a reasonably flat configuration for some time after the weld is made while the UHMWPE continues to crystallize. The glass transition temperature for polyethylene is 153 K. Above that temperature it will continue to crystallize over time.

As discussed above, in one embodiment, the plastic is brought to welding temperature by direct contact with heated platens. Alternate methods of heating are known, such as heating by ultrasonic or infra red radiation. Alternate methods can be used provided that the temperature of the material during welding is controlled and that pressure is applied to ensure that the thickness of the joint is substantially equal to that of the parent material.

Using a tapered weld also allows the weld to be subjected to significant pressure during the welding process. Sometimes, the two pieces to be welded do not align exactly, and there is a slight "interference" fit 81, as shown in FIG. 5. During the welding process, the material is held between two heated platens 76, 78. The platens provide a reference surface and determine the thickness of the weld. Providing for overlap ensures that there is sufficient material at the weld and that some material may flow to the open spaces provided. The degree of overlap can be quantified by comparing the thickness of the joint before welding (dimension 80) to that of the parent material (dimension 82). The sum of the dimension of the parent material (82) and the overlap (81) equals that of the thickness before welding (80). The fractional degree of overlap is (80-82)/82. To express the fractional degree of overlap as a percentage, the fractional value is multiplied by 100. In one example, the overlap is approximately 10%. In another example, an overlap of 60% was used and has worked well, but other values may be used as well. The overlap also serves to reduce the degree of accuracy required in the machining of the mating surfaces. It may be particularly important that the molten surfaces be pressed together during the welding process. If in the machining process, there is an inaccuracy in the surfaces such that they are not in contact, those surfaces will not form a satisfactory weld. By providing for overlap, a single fixed flat platen and a single movable flat platen can be used to press the surfaces together.

It is to be appreciated that the heating and cooling cycle is important, both in the temperatures reached and the time at different temperatures. It has also been found that edge effects are important in the heat transfer to and from the belt during the welding process. These edge effects can be overcome by using a sacrificial material at the edge of the belt which may later be cut off of the belt and discarded, to move the edge effect from the belt edge into a disposable member. Conveniently this member can also be a spacer that controls the spacing of the platens to that of the desired thickness of the belt.

A potential failure mode is the unpeeling of the weld. The belt is subjected to significant shear on one surface where it contacts the electrodes at tens of meters per second. Peeling back with wear of the exposed piece and sometimes with the protruding piece catching on a feed port can lead to catastrophic failure of the belt. The incidence of such a failure mode may be reduced by choosing the orientation of the weld overlap such that the thin tapered portion of the weld is on the trailing edge of the belt. With this orientation there is no tendency for the edge to peel back and for a failure of the weld to initiate and propagate across the joint. The orientation of the weld edges is seen in FIG. 5 relative to the leading edges of the cross strands 46. The belt may be installed in the machine with surface 88 facing an electrode and surface 90 facing another section of belt. The direction of travel of the belt with respect to stationary electrodes would then be as shown by arrow 92.

Producing a belt in this manner from machined sheets of UHMWPE allows for the profiles discussed in U.S. Pat. No. 5,904,253, herein incorporated by reference, to be utilized. One example of a convenient method is to use a multi-axis machine tool. With this device, a sheet is loaded onto a table and a cutter head is moved across the sheet and each opening in the belt may be cut individually. Through the proper choice of cutting tool, the holes can have the desired leading edge and trailing edge features as desired. It is to be appreciated that the desired leading edge geometry can be obtained through forming means such as molding, punching, machining, water jet cutting, laser cutting, and the like.

Referring again to FIG. 6, in a step 216 of this embodiment of the method of manufacturing the belt, the total length of the joined sections may be evaluated to determine whether it is sufficiently long to form a complete belt for the desired application. If not, additional sheets may be welded by repeating steps 208-214 as indicated by step 218, to form a composite sheet of a desired length. Opposing edges of the composite sheet may then be joined together to form a continuous belt, as indicated in steps 220-224.

The belt manufacturing method disclosed herein can also be utilized to produce belts for other applications. In many other applications, holes in the belt may be undesirable. As described above, according to one embodiment, material at the weld may be removed to break-up the weld into short independent sections. After this is done and the weld is made, the holes can be filled in with material to give a hole-free belt. It may be desirable, however, to allow for stress distribution around the welds and for the welds to remain structurally independent. One way of doing this is to fill the holes with a low modulus material, such as thin polyethylene film or foam. The foam is easily deformed and will accommodate substantial thermal strains generated during the welding.

With the capability of welding sheets of UHMWPE into continuous endless belts, flexibility in belt geometry can be achieved. The sheets can be held on a table and holes can be machined in the sheet. There is complete flexibility in selecting the geometry of the cross direction strands and the machine direction strands. The machine direction strands can be designed to have excellent fatigue life and the cross direction strands can have excellent separation geometry. The method of manufacture and materials described herein can thus be used to achieve longer life belts which are amenable to better geometry control. Producing BSS belts in this manner also allows for additional features to be incorporated.

Figure 8:
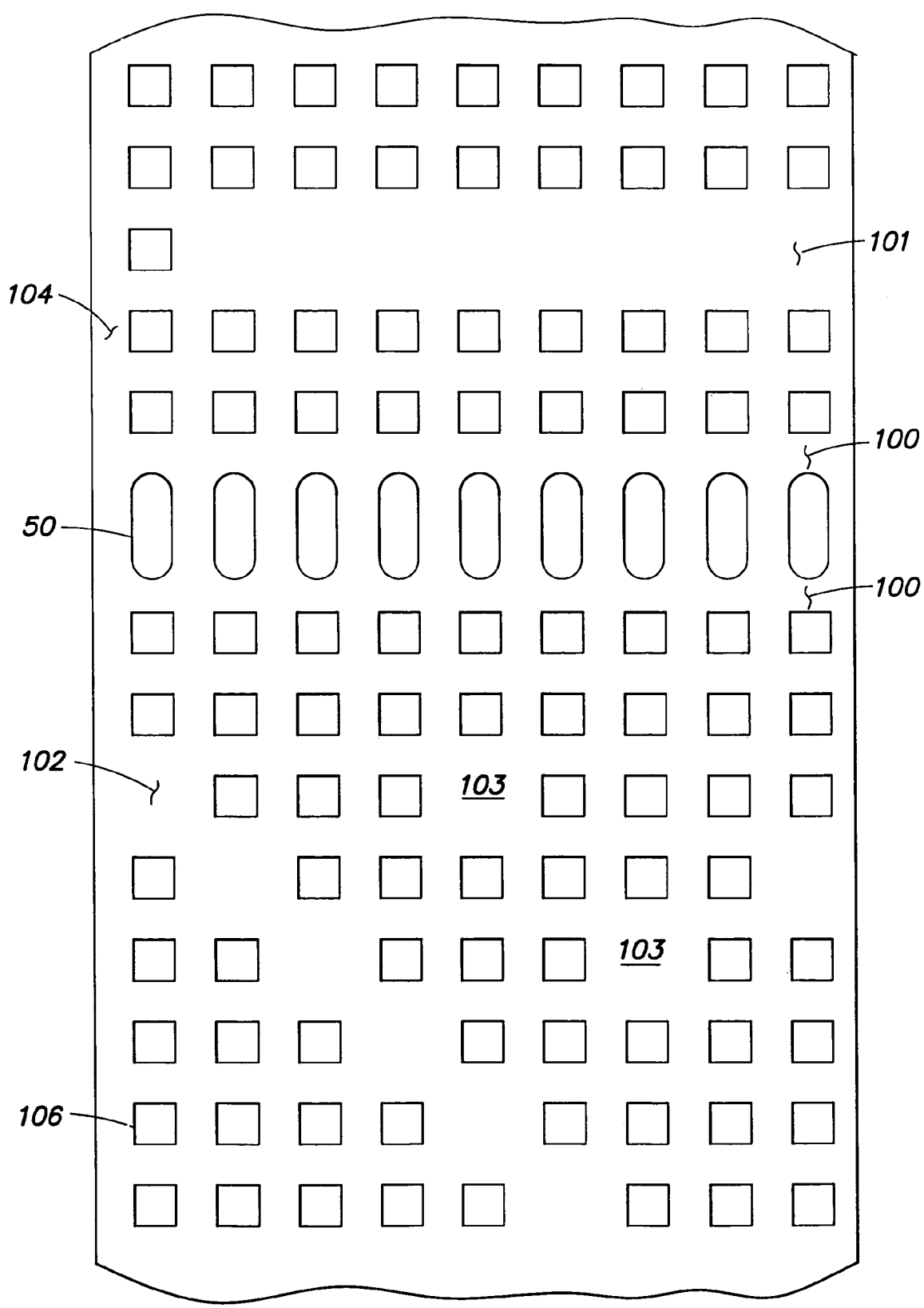
FIG. 8 is a plan view of a portion of a belt according to aspects of the invention.

It is to be appreciated that the BSS belt is used in a difficult environment. Flyash is abrasive and is often filled with tramp material. Stones, welding rod, bolts, gloves, refractory, and all manner of tramp material has been found in flyash, and numerous belt failures have resulted from tramp material. If the foreign object is larger than the gap between the electrodes, the object will not enter the machine but will remain hung up at a feed point until it gets ground up or until the belt is destroyed. In one embodiment of a belt of the invention, periodic strong transverse elements may be provided in the belt. An illustration of a portion of a belt showing such strength elements 100, 101, 102, 103 is shown in FIG. 8. The belt can get hung up at one of these strong elements and be stopped so that the machine can be opened and cleared of the tramp material. According to one example, the strong elements may be provided by periodically omitting machining holes 106 in the belt. Often it is useful to have this increased strength segment 100 as part of the weld. The belt may be seen to be torn in the lengthwise direction until the tear reaches a weld where the tear is terminated. Belts can then survive several such events occurring at different positions on the belt whereas with prior belts, a single event would result in a lengthwise tear the entire length of the belt and so destroy it. It is to be appreciated that these imperforate regions can be grouped as in a line either lengthwise, for example, along an edge 104. Alternatively, a strength member 101 may be provided as an imperforate section across a width of the belt, or diagonally (e.g. region 102, or they can be randomly disposed (e.g. regions 103), or disposed in a regular pattern.

Having thus described various illustrative embodiments and aspects thereof, modifications, and alterations may be apparent to those of skill in the art. For example, the sheet welding method disclosed herein may be used to weld materials other than UHMWPE, such as high density polyethylene nylon, polyester, and that thermoplastic sheet includes both perforated and imperforate sheets of any thermoplastic material. Such modifications and alterations are intended to be included in this disclosure, which is for the purpose of illustration and not intended to be limiting. The scope of the invention should be determined from proper construction of the appended claims, and their equivalents.

What is claimed is:

1. A belt comprising:
   a first portion of thermoplastic sheet comprising a first edge inclined with respect to a surface of the belt and a first plurality of openings along the first edge of the first portion of thermoplastic sheet so as to form recesses; and
   a second portion of thermoplastic sheet comprising a second edge inclined with respect to the surface of the belt and a second plurality of openings along the second edge of the second portion of thermoplastic sheet so as to form recesses;
   wherein the first and second inclined edges are joined together with an overlap to form overlapping portions;
   wherein the first plurality of openings and the second plurality of openings extend beyond the overlapping portions and;
   wherein the belt is perforated.

2. The belt as claimed in claim 1, wherein the first and second portions of thermoplastic sheet comprise nylon.

3. The belt as claimed in claim 1, wherein the first and second portions of thermoplastic sheet comprise ultra-high-molecular-weight-polyethylene.

4. The belt as claimed in claim 1, wherein the first and second portions of thermoplastic sheet comprise at least one olefinic monomer.

5. The belt as claimed in claim 1, wherein each of first and second inclined edges is tapered.

6. The belt as claimed in claim 1, wherein the first and second portions of thermoplastic sheet include a single thermoplastic sheet, and wherein the first and second edges are joined so as to form a continuous belt.

7. The belt as claimed in claim 1, further comprising at least one additional portion of thermoplastic sheet that is joined to at least one of the first and second portions of thermoplastic sheet to form a composite thermoplastic sheet.

8. The belt as claimed in claim 7, wherein opposing edges of the composite sheet are joined together to form a continuous belt.

9. The belt as claimed in claim 1, further comprising a strength member.

10. The belt as claimed in claim 9, wherein the strength member includes an imporforate section of thermoplastic sheet located proximate the first and second edges.

11. The belt as claimed in claim 9, wherein the strength member comprises an imporforate section of belt disposed along a longitudinal edge of the belt.

12. The belt as claimed in claim 1, wherein the first and second inclined edges form the overlap of the first and second thermoplastic sheets having a thickness that is approximately 10% greater than a thickness of the first portion of the thermoplastic sheet.

13. A belt comprising:
   a first portion of a thermoplastic sheet comprising a first plurality of inclined tabs spaced apart so as to define a first plurality of openings along a first edge of the first portion of the thermoplastic sheet; and
   a second portion of a thermoplastic sheet comprising a second plurality of matching inclined tabs to the first plurality of inclined tabs and spaced apart so as to define a second plurality of openings along a second edge of the second portion of the thermoplastic sheet;
   wherein the first plurality of tabs are joined to the second plurality of tabs so as to join the first edge to the second edge;
   wherein the first plurality of openings and the second plurality of openings extend beyond the joined first and second edges and
   wherein the belt is perforated.

14. The belt as claimed in claim 13, wherein the thermoplastic sheets comprises nylon.

15. The belt as claimed in claim 13, wherein the thermoplastic sheet comprises ultra-high-molecular-weight-polyethylene.

16. The belt as claimed in claim 13, wherein the thermoplastic sheet comprises at least one olefinic monomer.

17. The belt as claimed in claim 13, wherein the first and second portions of the thermoplastic sheet include a single thermoplastic sheet, and wherein the first and second edges are joined so as to form a continuous belt.

18. The belt as claimed in claim 13, further comprising at least one additional portion of a thermoplastic sheet that is joined to at least one of the first and second portions of the thermoplastic sheet to form a composite thermoplastic sheet.

19. The belt as claimed in claim 18, wherein opposing edges of the composite sheet are joined together to form a continuous belt.

20. The belt as claimed in claim 13, further comprising a strength member.

21. The belt as claimed in claim 20, wherein the strength member includes an imporforate section of thermoplastic sheet located proximate the first and second edges.

22. The belt as claimed in claim 20, wherein the strength member comprises an imporforate section of belt disposed along a longitudinal edge of the belt.

23. The belt as claimed in claim 13, wherein an open area of the perforated belt exceeds 50% of the total area of the belt.

24. The belt as claimed in claim 13, wherein the perforations in the belt include a leading edge with an acute angle.

25. The belt as claimed in claim 13, wherein the joined first and second edges form an overlap that is approximately 10% greater than a thickness of the first portion of the thermoplastic sheet.

* * * * *